United States Patent Office 3,407,570
Patented Oct. 29, 1968

3,407,570
FILTERING FOREIGN MATTER FROM A COLLECTING AIRSTREAM
Werner Steinmetz, Kempten, Switzerland, assignor to Pneumafil Corporation, Charlotte, N.C., a corporation of Delaware
Filed Dec. 15, 1965, Ser. No. 513,946
Claims priority, application Switzerland, Dec. 29, 1964, 16,767/64
9 Claims. (Cl. 55—97)

ABSTRACT OF THE DISCLOSURE

Means for filtering and collecting foreign matter from a collecting air stream in which the material is filtered from the collecting air stream on a filter screen over which a saw tooth profiled stripper-collector member is moved with the edge of said member scraping the filtered material from the screen and depositing it on the saw tooth profiled surface of the member. The movement of the stripper-collector member feeds the collected material away from the scraper edge of the member over the saw tooth profiled surface of the member, and the material is then compressed between the member and another saw tooth profiled surface which is movably mounted to move with respect to the member so as to discharge the collected material.

---

This invention relates to the art of filtering foreign matter from a collecting airstream, more particularly to an improved apparatus and method for separating the collected foreign matter from a collecting airstream such as is utilized in a textile mill installation.

A variety of filtering techniques are employed in air cleaning systems such as are presently utilized in textile mills, to implement the filtering of the collected foreign matter from the collecting airstream, permitting return of clean air to the mill area and collection of the foreign matter at a separate collection point. The filters must be periodically cleaned to remove the collected layers of foreign matter which accumulate on the filter surfaces, since resulting accumulations produce a pressure drop in the system which interferes with satisfactory operation of the suction cleaning systems, and it is necessary to provide means preventing these accumulations. The cleaning or removal of the foreign matter by hand is costly and unpleasant. Further the loose fibers generally forming the bulk of the collected foreign matter occupy a relatively large volume which increases the problems and expense of removal and handling.

Filtering techniques have been evolved utilizing mechanical cleaning devices for removing or stripping the filtered foreign matter from the filter screens. Such devices mechanically strip the deposit from the filter surface and collect the stripped material in a settling chamber from which it is removed pneumatically, mechanically or by hand. Other arrangements have been provided in which filter clothing is arranged over a filter screen and the filter clothing is periodically removed along with the entrained foreign matter.

These prior art techniques though serving to keep the filter surfaces in a relatively clean condition are not capable of handling relatively large quantities of waste due to the fact that their operation is dependent on the rapidity with which the stripped fibers can be removed. Additionally the stripped fibers are collected in a relatively loose condition presenting difficulties in subsequent handling, and often recontaminating the mill atmosphere.

Since textile mill waste is subject to reprocessing, in order to improve the quality of the reprocessed waste, it is desirable that the collected waste be subject to minimal handling thereby reducing the possibilities of contamination, and minimizing costs.

It is with the above problems and desiderata in mind that the present improved filtering means has been evolved, means including both method and apparatus permitting rapid and effective stripping of accumulated foreign matter from a filter surface, and removal of the stripped foreign matter in a compacted relatively manageable mass which is not subject to reintroduction to the mill atmosphere, and which requires minimal handling thereby minimizing costs, and improving the quality of the collected waste.

It is accordingly among the objects of this invention to provide an improved air filtering apparatus having means for stripping the collected material from the filtering surfaces of said apparatus, with the stripped material being subject to ready removal with minimum handling.

Another object of the invention is to provide air filtering means with means for stripping the filtered material from the filter screen in which the stripping action offers little or no interference with the filtering action.

A further object of the invention is to provide air filtering means in which the filtered waste material is not subject to further contamination after filtering.

A further object of the invention is to provide air filtering means in which the pressure drop through the filtering apparatus may be maintained substantially constant.

These and other objects of the invention which will become hereafter apparent are achieved by providing an air filtering apparatus in which a filter screen is employed having a filter surface upon which the filtered foreign matter is collected, which filter surface is shaped as a surface of revolution. The filter is preferably arranged within a housing having an inlet connected to an inlet duct which leads the collecting airstream to the concave portion of the filter. A stripper-collector plate is mounted for rotation about the axis of the body of revolution with a free end of the stripper-collector plate mounted to move over the filter surface to dislodge or strip any filtered material collected on said surface. A collector surface is formed on the stripper-collector plate, which is preferably of a sawtooth contour in cross-section with the teeth defining a plurality of inclined planes such that any material on said collecting surface is restricted for movement in one direction with respect to the plate. The stripper-collector plate is movable between two limiting positions in each of which it defines a collecting space closed off from the filter space. These collector spaces are formed between the collecting surface and a surface on a wall member spaced therefrom.

A feature of the invention resides in the fact that the formation of the filter surface in the shape of a surface of revolution serves the twofold function of permitting a larger filter surface to be enclosed in a given filter housing, and additionally permits movement of the stripper about an axis of rotation thus permitting a simplified drive to be employed.

Another feature of the invention resides in the fact that the stripped filtered material is simultaneously collected and compressed thereby reducing the necessary volume required for storage of the collected waste and implementing removal of the stripped fibers, minimizing likelihood of contamination of the fibers or their reintroduction to the mill area.

The specific details of a preferred embodiment of the invention, and their mode of function will be particularly pointed out in clear, concise and exact terms in conjunction with the accompanying drawings wherein.

Like parts in the figures will be designated by like reference numerals.

In the illustrated embodiment of the invention, the air filtering apparatus is shown as formed with a housing 1, which is made conventionally in several parts to facilitate assembly. An air inlet duct 2 is extended through a side wall of the housing, as best seen to the right in FIG. 1. The air inlet duct 2 is arranged in communication with the interior of filter 3.

Figure 1:
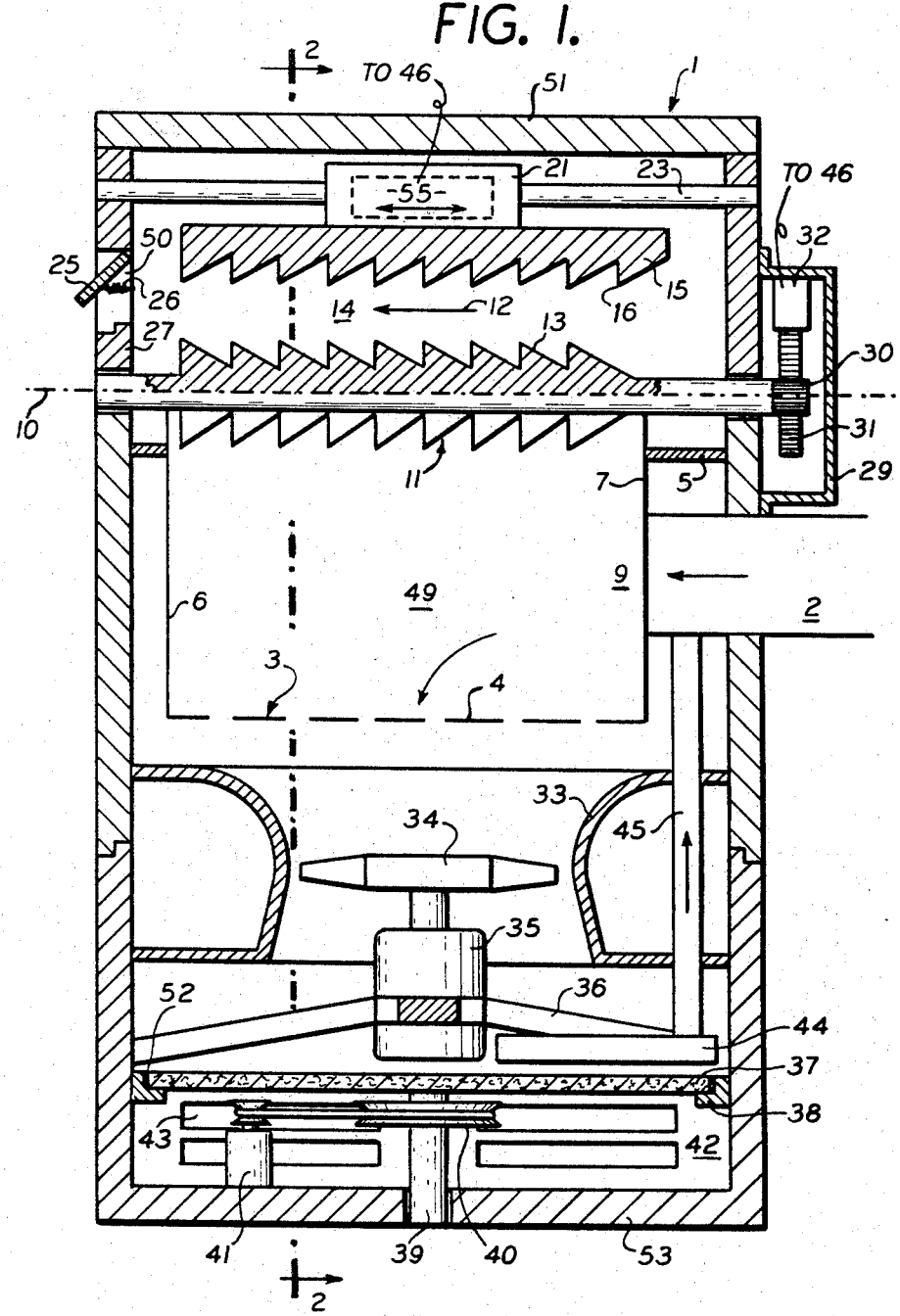
FIG. 1 is a schematic cross-sectional elevational view through an air filtering apparatus made in accordance with the teachings of this invention.
Figure 2:
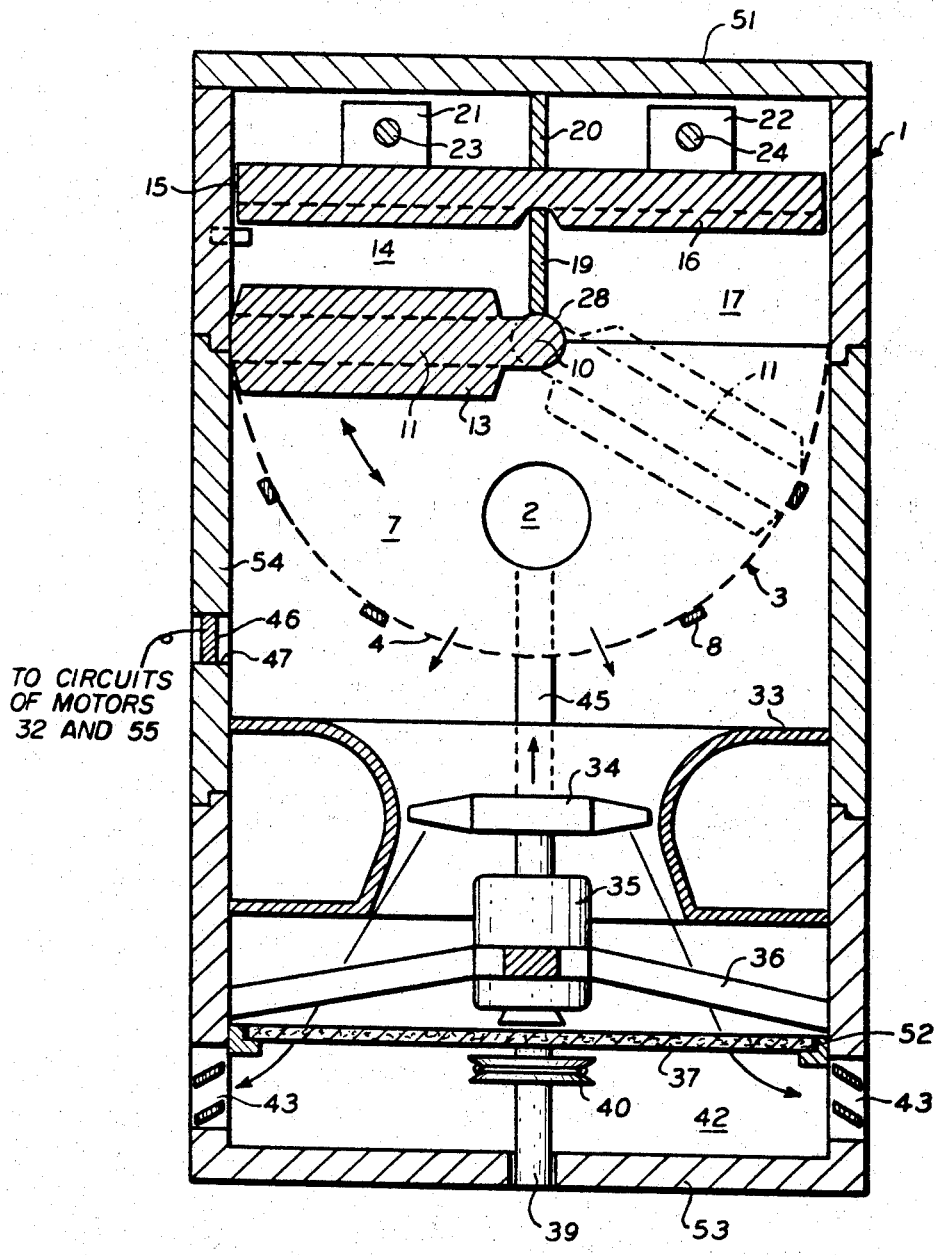
FIG. 2 is a cross-section taken on line II—II of FIG. 1.

Filter 3, as best seen in FIG. 2, is of a semi-cylindrical configuration provided with filter surface 4 which lies along the interior surface of the cylindrical body of revolution of the filter 3. Struts 5 support the filter 3 within the housing 1. The filter surface 4 is of an air permeable filtering material such for example as copper cloth or the like. End walls 6 and 7 of the filter 3 are of an air impermeable material. Cross braces 8 extend between end walls 6 and 7, as best seen in FIG. 2, and serve to space the end walls one from the other, and provide support for the screen or mesh forming filter surface 4. End wall 7 is formed with an air inlet opening 9 to which inlet duct 2 is coupled so that there is a smooth flow of air from the inlet duct through inlet opening 9. The axis of filter 3 is designated by the numeral 10 applied to the dot-dash line of FIG. 1.

A stripper-collector plate 11 is formed with a collector surface 13 having a sawtooth profile as best seen in FIG. 1. The contours of the sawtooth profile are such that any material on the collector surface 13 will be restricted from moving against the direction of arrow 12 in the collection chamber 14, as will be understood by those skilled in the art.

A wall member 15 having a sawtooth profile lower surface 16, as best seen in FIG. 1, is arranged at a spaced distance from stripper-collector plate 11 to form the upper boundary of collection chamber 14, when the plate is in the orientation illustrated by the solid lines in FIG. 2 or the collection chamber 17 when the plate 11 is moved 180 degrees from the solid line position illustrated in FIG. 2 to the right. The phantom showing of plate 11 in FIG. 2 shows the plate 11 as it is being moved from its extreme left-hand position toward its extreme right-hand position about axis of rotation 10. A partition wall 19 and its upper extension 20 above wall 15 is arranged in housing 1 to provide relatively airtight separation between the left-hand collection chamber 14 and the right-hand collection chamber 17, as seen in FIG. 2.

Wall member 15 is movably mounted by means of bearing blocks 21 and 22 on slide bars 23 and 24 respectively to permit lateral reciprocation of the wall member 15 in housing 1, as seen in FIG. 1.

A valve flap 25, as seen in FIG. 1, is normally biased by spring 26 to a position against seat 27 to normally close off the collection chamber 14 from the exterior of the housing. A similar spring biased flap and seat arrangement is provided for collection chamber 17.

Stripper-collector plate 11 is mounted for rotation on shaft 28, as best seen in FIG. 1, which is coaxial with filter axis 10. The shaft 28 extends from the left-hand side of the housing as seen in FIG. 1 where it is appropriately journaled for rotation through the right-hand side of the housing 1 into a drive housing 29. Shaft 28 is formed with a pinion 30 at its end which engages rack 31 operatively coupled to a motor 32 which is preferably of a piston cylinder air motor type in which reciprocation of the piston of the air motor 32 reciproates rack 31.

Within the housing 1, at the lower part thereof as illustrated in the drawing beneath filter 3, an annular diffuser ring 33 is arranged encompassing blower 34. The blower 34 has blades contoured to cause air flow in the direction of the arrows from inlet duct 2 downwardly through the filter 3. Blower 34 is driven by blower motor 35 which is supported on struts 36 extending from the motor to the housing side walls.

A disc filter 37 is mounted beneath blower 34 for rotation on annular seating flange 38. The disc filter 37 is mounted for rotation on shaft 39 journaled for rotation with respect to the lower wall of housing 1. Pulley 40 is fixed on shaft 39, and coupled to motor 41 by appropriate belting so that upon energization of motor 41 the pulley 40 will be driven to rotate shaft 39 and the disc filter 37 mounted thereon. Baffled air outlets 42 and 43, as best seen in FIG. 2, are arranged through the lower parts of side walls of the housing 1 beneath disc filter 37.

A suction header 44 comprising a tubular duct having a plurality of spaced inlet orifices is positioned above disc filter 37, as best seen to the lower right in FIG. 1, and is coupled to return conduit 45 leading to air inlet duct 2. Air flow in the suction header and return conduit is indicated by the arrows shown in FIG. 1.

A pressure sensing element 46 is arranged in an opening 47 of a side wall of housing 1, as seen to the left in FIG. 2. Pressure sensing element 47 is coupled to air motor 32 to control the operation of the stripper-collector plate 11, as will be hereinafter more fully described, so that when the pressure outside filter space 49 exterior of filter 3 drops as a result of a fiber accumulations on the filter surface 4 the pressure sensing element 47 responds to initiate stripper operation.

A discharge opening 50 through which filtered waste is ejected and within which flap 25 is mounted, as best seen in FIG. 1, is provided above the stripper-collector plate 11. Top wall 51 of the housing 1 closes off the top of the housing.

Packing 52 is preferably arranged between flanges 38 and disc filter 37 to insure air passage through the disc filter 37. The bottom wall of the housing is designated by the numeral 53 and the wall of the housing in which the pressure sensing element 47 is arranged is designated by the numeral 54.

A motor 55 is mounted in bearing block 21 to effect reciprocation of the wall member 15. This motor 55 is preferably an air motor of a double acting piston cylinder type in which the piston is coupled to the slide bar 23 so that, as will be understood by those skilled in the art, depending on which side of the piston the air is introduced, the direction of reciprocation of the wall member 15 will be controlled. This motor 55, like motor 32, is also coupled for actuation in response to pressure sensing element 47.

The volume of each of the two collecting chambers 14 and 17 is approximately one-tenth the volume of the filter space 49.

OPERATION

The apparatus here disclosed finds particular utility in filtering collected foreign matter from a collecting airstream such as is utilized in pneumatic textile mill cleaning installations. It will, however, be appreciated by those skilled in the art that the filtering apparatus may be employed in conjunction with a variety of other systems where dirt laden air is to be filtered.

In use, the filtering apparatus may be coupled to air supply ducts which are led into the apparatus from opposite sides thereof as viewed in FIG. 1, although one inlet duct 2 is illustrated. It will be understood that a similar inlet duct may be extended into the housing through end wall 6 of the filter 3. Thus the apparatus can be arranged at the center of a spinning frame or the like permitting a reduction of length of the collection ducts, and thus smaller pressure drops, and reduced power requirements.

Blower motor 35 is energized to set up an airstream drawing the collecting air through inlet duct 2 into the filter space 49 in filter 3. The foreign matter entrained in the airstream is filtered on filter surface 4, while the air passes through the filter through diffuser 33. Secondary filtering to insure maximum cleanliness of the air is accomplished by means of disc filter 37 through which the air passes from diffuser 33. Disc filter 37 is rotated as a result of energization of motor 41. Any accumulations of fibers on the upper surface of disc filter 37 are removed as a result of passage of the disc filter beneath the suction header 44 which serves to pick up these filtered fibers from the disc filter 37 and return them via return conduit 35 to inlet duct 2, whence these filtered fibers are fed into filter space 49.

The air after passing through filters 3 and 37 is discharged through baffled air outlets 42 and 43.

Any pressure drop occurring outside of filter 3 within housing 1 is detected by pressure sensing element 46, which is coupled to control the operation of motors 32 and 55. Since this pressure drop results when the filter surface 4 becomes clogged with filtered material, this clogging and resulting pressure drop actuates the sensing element to initiate operation of motors 32 and 55. Accordingly stripper plate 11 is moved by the action of air motor 32 causing movement of rack 31 which drives pinion 30 to rotate shaft 28. Rotation of shaft 28 causes stripper-collector plate 11 to be moved from the solid line position illustrated in FIG. 2 in the direction of the arrows through 180 degrees. In moving from left to right as illustrated in FIG. 2, the free edge of the stripper-collector plate 11 engages the filter surface 4 stripping any filtered material collected thereon. This filtered material is collected on the sawtoothed collector surface 13 and carried thereby to collection chamber 17 as seen to the right in FIG. 2. In moving the fibers into collection chamber 17, the stripped fibers will be compressed between the wall member 15 and the collector surface 13, and completely removed from the filter area 49, thus preventing interference with the filtering operation.

Wall member 15 has been set into reciprocation by the actuation of motor 55. As a result of this reciprocation, the stripped and collected filtered material which has been compressed in the collection chamber 17 is moved towards the discharge opening 50, and is further compressed against the spring biased flap 25. When the compression of the collected material produces a pressure exceeding the forces exerted by spring 26, flap 25 opens and the compacted material is ejected. It is preferred that motor 55 be provided with a time switch which will limit its period of reciprocation to occur after the fibers have been compressed in collection chamber 17.

Reversal of movement of the stripper-collector plate 11 in response to the pressure sensed by pressure sensing element 46 results in stripping of the fibers and compacting of same into the collection chamber 14 on the left of FIG. 2, as will be understood by those skilled in the art from the above description.

As a result of the above described arrangement, the function of the filter 3 is not interrupted by the stripping process, and continuous filtering may be obtained.

The above disclosure has been given by way of illustration and elucidation, and not by way of limitation, and it is desired to protect all embodiments of the herein disclosed inventive concept within the scope of the appended claims.

What is claimed is:

1. Air filtering apparatus for separating entrained foreign matter from a collecting airstream, said apparatus comprising: a filter member adapted for positioning in filtering relationship with the airstream to be filtered; a stripper-collector member movably mounted with respect to said filter member so that relative motion between said stripper member and said filter member will result in a portion of said stripper-collector engaging the foreign matter collecting on said filter member to strip the foreign matter from the filter member and move same along said member; a collector surface on said stripper member over which the collected material is moved and supporting the material stripped by said stripper member, said surface formed with projections profiled to constrain the stripped material for movement in a given direction on said surface as said stripper member is moved; and a wall member mounted for relative motion between said collector surface and said wall member to compress the collected stripped material on said collector surface.

2. Apparatus as in claim 1 having pressure sensing means responding to pressure conditions in said apparatus coupled to control stripping action.

3. Apparatus as in claim 1 in which said collector surface on said stripper-collector member is formed with projections restricting movement of the collected stripped material thereon to one direction.

4. Apparatus as in claim 1 in which a disc filter is mounted in the filtered airstream leaving said filter member; and a suction header is arranged in communication with the collecting airstream to pneumatically remove any material filtered by said disc filter and return same to the collecting airstream.

5. Apparatus as in claim 1 in which said filter member comprises: a filter screen having a surface upon which the foreign matter is collected which surface lies along a surface sector of a body of revolution; and means mounting said stripper collector member for rotation about the axis of revolution of the generatrix of the filter surface, with one end of said stripper-collector member moving over the filter surface to strip foreign matter therefrom.

6. Apparatus as in claim 5 in which a reciprocable mounting is provided for said wall member supporting said wall member at a spaced distance from the collector surface on the stripper-collector member at a limit of rotation of said stripper-collector member to form a collection chamber between the collector surface and said wall member, with reciprocation of said wall member further compressing the collected stripped material, and feeding the collected material along said collector surface.

7. In air filtering apparatus in which a collecting airstream is fed to an enclosure for separation of the entrained foreign matter from the airstream and subsequent discharge of the collected foreign matter and discharge of the air from which the foreign matter has been removed, an improved filter and filter cleaning arrangement comprising: a filter member positioned in the collecting air stream, said filter member having a filter surface formed as a surface sector of a body of revolution encompassing a filter area; a stripper-collector member mounted for rotation about the axis of said body of revolution, said member having a portion moveable over the filter surface to strip filtered material therefrom, and a collecting portion on said member on which the foreign matter removed from said filter surface is collected, said surface formed with projections of a saw tooth contour in cross-section with the teeth defining a plurality of inclined planes downwardly inclined towards the desired direction of movement of the material to constrain the stripped material for movement in the direction of incline of said teeth as said collector member is moved, said member being swingable between two limiting positions, at least one of which delimits a collecting area remote from the filter area within which collecting area the collected foreign matter is compressed; and a reciprocable wall member opposite said stripper collector member when it is in a limiting position to define the collecting area.

8. A method of filtering foreign matter from a collecting airstream, said method comprising the steps of:
   arranging a filter member in filtering relationship with the collecting airstream;
   stripping the collected foreign matter from the filter member;
   collecting the stripped foreign matter on a collecting surface;
   and simultaneously feeding the stripped foreign matter along the collecting surface and compressing the stripped foreign matter.

9. A method of filtering as in claim 8 in which after the step of simultaneously collecting and compressing the stripped foreign matter, it is further compressed by exerting a pressure on the foreign matter at an angle to its first direction of compression.

References Cited

UNITED STATES PATENTS

| | | | |
|---|---|---|---|
| 947,013 | 1/1910 | Dowd | 100—144 X |
| 987,869 | 3/1911 | Epps | 100—144 |
| 1,512,028 | 10/1924 | Johnson | 210—415 |
| 1,812,412 | 6/1931 | Olson | 55—297 |
| 1,837,034 | 12/1931 | Freund | 100—209 X |
| 2,401,394 | 6/1946 | White | 55—283 X |
| 2,430,973 | 11/1947 | Boissonnault | 100—218 X |
| 2,671,248 | 3/1954 | Wallace | 55—296 |
| 2,827,128 | 3/1958 | Hersey | 55—283 |
| 2,906,195 | 9/1959 | Zysset | 100—233 X |
| 2,949,078 | 8/1960 | Reed | 100—233 X |
| 2,955,529 | 10/1960 | Marble | 100—233 X |
| 3,045,274 | 7/1962 | Sohler | 55—297 X |
| 3,070,006 | 12/1962 | Raney et al. | 100—233 X |
| 3,111,892 | 11/1963 | Deems | 100—90 |
| 3,134,321 | 5/1964 | Loehnert | 100—209 X |
| 3,220,171 | 11/1965 | Hadler | 100—189 X |
| 3,232,463 | 2/1966 | Weir | 214—83.3 X |

FOREIGN PATENTS

| | | |
|---|---|---|
| 66,882 | 2/1893 | Germany. |
| 473,549 | 3/1929 | Germany. |

HARRY B. THORNTON, *Primary Examiner.*

D. TALBERT, *Assistant Examiner.*